(12) United States Patent
Mitchell et al.

(10) Patent No.: US 7,319,788 B2
(45) Date of Patent: Jan. 15, 2008

(54) VISUALIZATION OF S TRANSFORM DATA USING PRINCIPAL-COMPONENT ANALYSIS

(75) Inventors: J. Ross Mitchell, Calgary (CA); T. Chen Fong, Calgary (CA); Hongmei Zhu, Calgary (CA)

(73) Assignee: Calgary Scientific Inc., Calgary, Alberta (CA)

( * ) Notice: Subject to any disclaimer, the term of this patent is extended or adjusted under 35 U.S.C. 154(b) by 993 days.

(21) Appl. No.: 10/430,293

(22) Filed: May 7, 2003

(65) Prior Publication Data

US 2003/0212490 A1    Nov. 13, 2003

Related U.S. Application Data

(60) Provisional application No. 60/378,962, filed on May 10, 2002.

(51) Int. Cl.
*G06K 9/34* (2006.01)
(52) U.S. Cl. ............... 382/173; 382/224; 382/260; 345/582
(58) Field of Classification Search .......... 382/276, 382/173, 224, 260; 345/582
See application file for complete search history.

(56) References Cited

U.S. PATENT DOCUMENTS

| 6,850,062 B2* | 2/2005 | Mitchell et al. ............ 324/307 |
| 2003/0210047 A1* | 11/2003 | Mitchell et al. ............ 324/309 |
| 2005/0253863 A1* | 11/2005 | Mitchell et al. ............ 345/582 |

OTHER PUBLICATIONS

Mansinha et al.; "Pattern Analysis with Two Dimensional Spectral Localisation: Applications of 2 Dimensional S Transforms", Physica A, 239, p. 286-295, 1997.*

Stockwell et al.; "Localization of the Complex Spectrum: The S Transform", IEEE Transactions of Signal Processing, vol. 44 No. 4, Apr. 1996.*

Duda et al.; Pattern Classification—Section 3.8 and 10.13, Wiley Interscience, 2001.*

(Continued)

*Primary Examiner*—Bhavesh M Mehta
*Assistant Examiner*—John B Strege
(74) *Attorney, Agent, or Firm*—Freedman & Associates

(57) ABSTRACT

The present invention relates to a method for visualizing ST data based on principal component analysis. ST data indicative of a plurality of local S spectra, each local S spectrum corresponding to an image point of an image of an object are received. In a first step principal component axes of each local S spectrum are determined. This step is followed by the determination of a collapsed local S spectrum by projecting a magnitude of the local S spectrum onto at least one of its principal component axes, thus reducing the dimensionality of the S spectrum. After determining a weight function capable of distinguishing frequency components within a frequency band a texture map for display is generated by calculating a scalar value from each principal component of the collapsed S spectrum using the weight function and assigning the scalar value to a corresponding position with respect to the image. The visualization method according to the invention is a highly beneficial tool for image analysis substantially retaining local frequency information but not requiring prior knowledge of frequency content of an image. Employment of the visualization method according to the invention is highly beneficial, for example, for motion artifact suppression in MRI image data, texture analysis and disease specific tissue segmentation.

27 Claims, 13 Drawing Sheets

OTHER PUBLICATIONS

Matsushiro et al.; "Principal Component Analysis of Spectral Image Based on hte Independence of the Color Matching Function Vector", Proc. of Third International Conference on Multispectral Color Science, p. 77-80, 2001.*

Smith, Lindsay; "A Tutorial on Principal Components Analysis", Feb. 26, 2002.*

Zhu et al.; "The Stockwell Transform: A Potentially Powerful Processing Tool in MRI", Proc. Intl. Soc. Mag. Reson. Med. 10, 2002.*

Goodyear et al.; "Filtering Noise from fMRI Data Using the Stockwell Transform", Proc. Intl. Soc. Mag. Reson. Med. 10, 2002.*

Mansinha et al., "Local S-spectrum Analysis of 1-D and 2-D Data", Physics of the Earth and Planetary Interiors, Elsevier Science B.V., No. 103, pp. 329-336, 1997.

Oldenborger et al., "Space-Local Spectral Texture Segmentation Applied to Characterizing the Heterogeneity of Hydraulic Conductivity," Water Resources Research, Aug. 2002.

Eramian, et al., "Generation of Aquifer Heterogeneity Maps Using Two-Dimensional Spectral Texture Segmentation Techniques," Mathemetical Geology, vol. 31, No. 3, pp. 327-348, 1999.

* cited by examiner

```
┌─────────────────────────────────────────────────────────────────┐
│ receiving the ST data, the ST data being indicative of a plurality of │
│ local S spectra, each local S spectrum corresponding to an image │
│ point of an image of an object                                  │
└─────────────────────────────────────────────────────────────────┘
                                  │
                                  ▼
┌─────────────────────────────────────────────────────────────────┐
│ determining principal component axes of each local S spectrum   │
└─────────────────────────────────────────────────────────────────┘
                                  │
                                  ▼
┌─────────────────────────────────────────────────────────────────┐
│ determining for each local S spectrum a collapsed local S       │
│ spectrum by projecting a magnitude of the local S spectrum onto │
│ the first principal component axes                              │
└─────────────────────────────────────────────────────────────────┘
                                  │
                                  ▼
┌─────────────────────────────────────────────────────────────────┐
│ reducing each principal component projection to a scalar        │
└─────────────────────────────────────────────────────────────────┘
                                  │
                                  ▼
┌─────────────────────────────────────────────────────────────────┐
│ processing the collapsed local S spectra to extract features    │
│ relating to a physical occurrence within the object therefrom   │
└─────────────────────────────────────────────────────────────────┘
```

Fig. 2a

```
┌─────────────────────────────────────────────────────────────────┐
│ receiving the ST data, the ST data being indicative of a plurality of │
│ local S spectra, each local S spectrum corresponding to an image │
│ point of an image of an object                                  │
└─────────────────────────────────────────────────────────────────┘
                                  │
                                  ▼
┌─────────────────────────────────────────────────────────────────┐
│ determining principal component axes of each local S spectrum   │
└─────────────────────────────────────────────────────────────────┘
                                  │
                                  ▼
┌─────────────────────────────────────────────────────────────────┐
│ determining for each local S spectrum a first collapsed local S │
│ spectrum by projecting a magnitude of the local S spectrum onto │
│ the first principal component axes                              │
└─────────────────────────────────────────────────────────────────┘
                                  │
                                  ▼
┌─────────────────────────────────────────────────────────────────┐
│ determining for each local S spectrum a second collapsed local S │
│ spectrum by projecting a magnitude of the local S spectrum onto │
│ the second principal component axes                             │
└─────────────────────────────────────────────────────────────────┘
                                  │
                                  ▼
┌─────────────────────────────────────────────────────────────────┐
│ reducing each principal component projection to a scalar        │
└─────────────────────────────────────────────────────────────────┘
                                  │
                                  ▼
┌─────────────────────────────────────────────────────────────────┐
│ processing the first and the second collapsed local S spectra to │
│ extract features relating to a physical occurrence within the object │
│ therefrom                                                        │
└─────────────────────────────────────────────────────────────────┘
```

Fig. 2c

VISUALIZATION OF S TRANSFORM DATA USING PRINCIPAL-COMPONENT ANALYSIS

This application claims benefit from U.S. Provisional Application No. 60/378,962 filed May 10, 2002.

FIELD OF THE INVENTION

This invention relates to visualization of S transform data and in particular to a new method for processing S transform data based on principal-component analysis.

BACKGROUND OF THE INVENTION

The Fourier transform of a function $f(t)$ has served as the most important transform in numerous signal processing applications. For example, the Fourier transform is widely used in imaging analysis such as CT and Magnetic Resonance Imaging (MRI).

Standard Fourier analysis reveals individual frequency components involved in a signal or image. However, in many situations of frequencies changing over time or space the standard Fourier analysis does not provide sufficient information. In numerous applications processing of non-stationary signals or images reveals important information. For example, in MRI signal processing motion caused by respiratory activity, cardiac activity, blood flow causes temporal changes in spatial frequencies.

To overcome the deficiency of the standard Fourier analysis, other techniques such as the Gabor transform (GT) disclosed in: Gabor, D. "Theory of communications", J. Inst. Elec. Eng., 1946; 93, 429-457, also known as the short time Fourier transform, and the Wavelet transform (WT) disclosed in: Goupillaud P., Grossmann, A., Morlet J. "Cycle-octave and related transforms in seismic signal analysis", Geoexplor, 1984; 23, 85-102, and in: Grossmann, A., Morlet J. "Decomposition of Hardy functions into square integrable Wavelets of constant shape", SIAM J. Math. Anal., 1984; 15, 723-736, have been developed, references to which are incorporated herein by reference. Both of these methods unfold the time information by localizing the signal in time and calculating its "instantaneous frequencies." However, both the GT and the WT have limitations substantially reducing their usefulness in the analysis of imaging signal data. The GT has a constant resolution over the entire time-frequency domain which limits the detection of relatively small frequency changes. The WT has variant resolutions, but it provides time vs. scale information as opposed to time vs. frequency information. Although "scale" is loosely related to "frequency"—low scale corresponds to high frequency and high scale to low frequency—for most wavelets there is no explicit relationship between scale factors and the Fourier frequencies. Therefore, the time-scale representation of a signal is difficult if not impossible to interpret.

In 1996 another approach for time-frequency analysis has been disclosed in 1D form by Stockwell R. G., Mansinha L., Lowe R. P., "Localization of the complex spectrum: the S-transform", IEEE Trans. Signal Process, 1996; 44, 998-1001. In 1997 the two-dimensional S transform has been disclosed in Mansinha L., Stockwell R. G., Lowe R. P., "Pattern analysis with two dimensional localization: Applications of the two dimensional S transform", Physica A., 1997; 239, 286-295, and in Mansinha L., Stockwell R. G., Lowe R. P., Eramian M., Schincariol R. A., "Local S spectrum analysis of 1D and 2D data", Phys. Earth Planetary Interiors, 1997; vol. 239, no. 3-4, 286-295, references to which are incorporated herein by reference. The ST has been successfully applied in analyzing temporal or spatial variances of the spectrum of a time series or an image, respectively.

However, the ST of a 2D image function $I(x, y)$ retains the spectral variables $k_x$ and $k_y$ as well as the spatial variables $x$ and $y$, resulting in a complex-valued function of four variables. Therefore, visualization of 2D ST results is a difficult task requiring substantially large computer storage capability and long computer processing time.

There have been several different approaches for visualizing the 2D ST disclosed in the recent literature. In Mansinha L., Stockwell R. G., Lowe R. P., "Pattern analysis with two dimensional localization: Applications of the two dimensional S transform", Physica A., 1997; 239, 286-295, slicing of the S space along x or y directions has been disclosed. Such a method provides an understanding of local information but does not supply a continuous picture of frequency variation over space.

Dominant wave number mapping, disclosed in Mansinha L., Stockwell R. G., Lowe R. P., Eramian M., Schincariol R. A., "Local S spectrum analysis of 1D and 2D data", Phys. Earth Planetary Interiors, 1997; vol. 239, no. 3-4, 286-295, records the maximum magnitude in the local spectrum at every spatial point. If the frequency component with the maximum magnitude dominates the local spectra the local dominant wave number map reveals distinctive subregions or textures. However, when more than one dominant frequency component appears in the local spectral domain choosing one with maximum amplitude results in a loss of important details in the structure.

In Eramian M. G., Schincariol R. A., Mansinha L., and Stockwell R. G., "Generation of aquifer heterogeneity maps using two-dimensional spectral texture segmentation techniques", Math. Geol., 1999, vol. 31, no. 3, 327-348, the binary encoded S transform (BEST) method representing each local spectrum with a binary number is disclosed. However, due to non-linear weighting of the local spectrum, slight changes at high frequencies cause very different values in corresponding binary number assignments. Furthermore, ordering of the subregions is not unique, resulting in different interpretations of the texture. Thus the BEST method provides reliable results only when the dominant frequency components occur where the power of the spectrum is evenly distributed.

Eramian et al. further disclosed in the above reference the angular difference method ADM. The ADM provides a relative angular difference between a local spectrum and a reference spectrum allowing measuring of spectral variations with respect to the reference spectrum. However, the ADM is insensitive to subtle changes at frequencies not present in the reference spectrum.

In Oldenburger G. A., "Characterizing the spatial distribution of hydraulic conductivity: Application of ground penetrating radar and space-local spectral techniques", M.Sc. Thesis, University of Western Ontario, London, 2000, and Oldenburger G. A., Schincariol R. A., and Mansinha L. "Space-local spectral texture segmentation applied to characterizing the heterogeneity of hydraulic conductivity", Water Resources Research, 38, 10.1029/2001 WR000496 (2002) a combination of the ADM and BEST methods using a weighted scalar product (WSP) with a reference matrix is disclosed. Here, a good choice of the reference matrix is crucial since it determines how different frequency components are distinguished.

Summarizing the above analysis of the prior art, all the above methods require prior knowledge about frequency content in an image for visualizing ST data.

SUMMARY OF THE INVENTION

It is, therefore, an object of the invention to provide a method for visualizing S transform data that is capable of better capturing local spectral information.

It is further an object of the invention to provide a method for visualizing S transform data without prior knowledge of frequency content.

In accordance with the present invention there is provided a method for processing ST data comprising the steps of:

receiving the ST data, the ST data being indicative of a plurality of local S spectra, each local S spectrum corresponding to an image point of an image of an object;

determining principal component axes of each local S spectrum;

determining for each local S spectrum a collapsed local S spectrum by projecting a magnitude of the local S spectrum onto at least one of its principal component axes; and, processing the collapsed local S spectra to extract features relating to a physical occurrence within the object therefrom.

In accordance with the present invention there is further provided a method for visualizing ST data comprising the steps of:

receiving the ST data, the ST data being indicative of an S spectrum of an image of an object;

determining a collapsed S spectrum by reducing the dimensionality of the S spectrum based on principal component analysis;

determining a weight function capable of distinguishing frequency components within a frequency band;

forming a texture map by calculating a scalar value from each principal component of the collapsed S spectrum using the weight function and assigning the scalar value to a corresponding position with respect to the image; and, displaying the texture map for extracting features relating to a physical occurrence within the object therefrom.

In accordance with the present invention there is yet further provided a method for processing ST data comprising the steps of:

sensing a signal received from an object and providing image signal data in dependence thereupon;

determining a S spectrum by S transforming the image signal data;

calculating a magnitude of each local S spectrum corresponding to an image point;

determining a covariance matrix for each image point using the magnitude of the local S spectrum;

determining principal component axes for each image point based on the covariance matrix;

mapping for each image point frequency components of the local S spectrum onto respective principal component axes;

partitioning for each image point the principal component axes into a plurality of bins having a predetermined width; and, determining for each image point a local collapsed S spectrum by summing for each bin amplitudes of frequencies falling within the bin and dividing by the bin width.

The method for visualizing ST data according to the invention is a highly beneficial tool for image analysis substantially retaining the local frequency information but not requiring prior knowledge of the frequency content of an image. Employment of the visualization method according to the invention is highly beneficial, for example, in motion artifact suppression in MRI image data, texture analysis and disease specific tissue segmentation.

BRIEF DESCRIPTION OF THE FIGURES

Exemplary embodiments of the invention will now be described in conjunction with the following drawings, in which:

FIGS. 2a to 2c are simplified flow diagrams of various embodiments of a method for visualizing ST data according to the invention;

DETAILED DESCRIPTION OF THE INVENTION

Hereinbelow, the method for visualizing ST data according to the invention is disclosed describing processing of ST data of 2D images. It is evident to those of skill in the art based on the explanation below that the method for visualizing ST data according to the invention is not limited thereto but is also applicable for the processing of higher dimensional image data such as 3D images or time varying 3D images resulting in 4D image data. Furthermore, the method for visualizing ST data according to the invention provides means for directly visualizing local frequency content of other 2D data such as 1D spatial series evolving over time, where the local frequency content is calculated using the S transform or other localized transforms such as Gabor or Wavelet transforms.

Figure 1A:
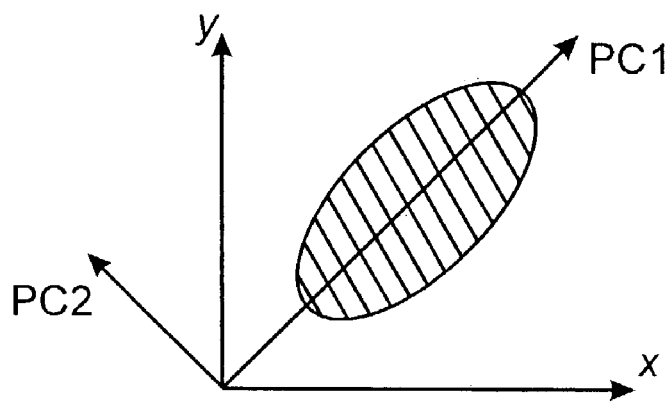
FIGS. 1a to 1c are schematically illustrating the concept of the principal component analysis.
Figure 1B:
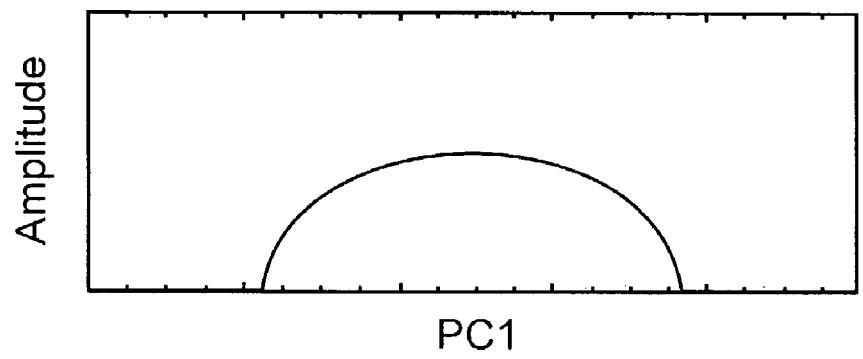
Figure 1C:
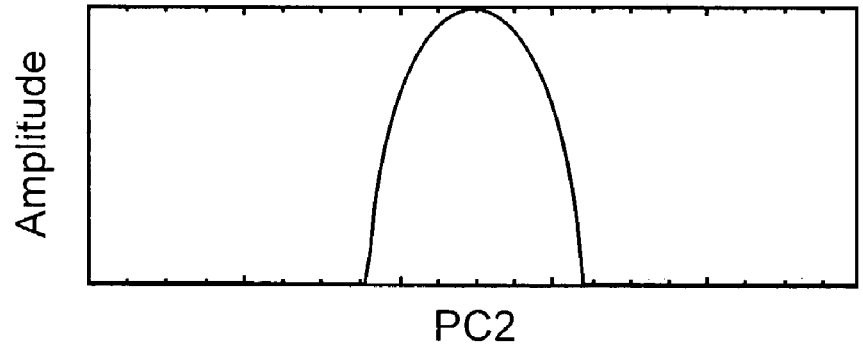

The method for visualizing ST data according to the invention is based upon principal-component analysis (PCA) of a local spectrum. The PCA aligns a 2D data set or image with its principal eigenvectors by establishing a new coordinate system having axes in directions of orthogonal eigenvectors of an associated covariance matrix. FIGS. 1a to 1c represent a simple illustration of the PCA applied to an image of an ellipse. FIG. 1a illustrates the ellipse with its principal component axes PC1 and PC2. FIG. 1b illustrates projection of the image data onto the first principal component axis PC1 and FIG. 1c illustrates projection of the image data onto the second principal component axis PC2. As is evident from FIGS. 1a to 1c the PCA reduces the dimensionality of 2D image by producing two ID projections onto the axes PC1 and PC2.

Figure 2B:
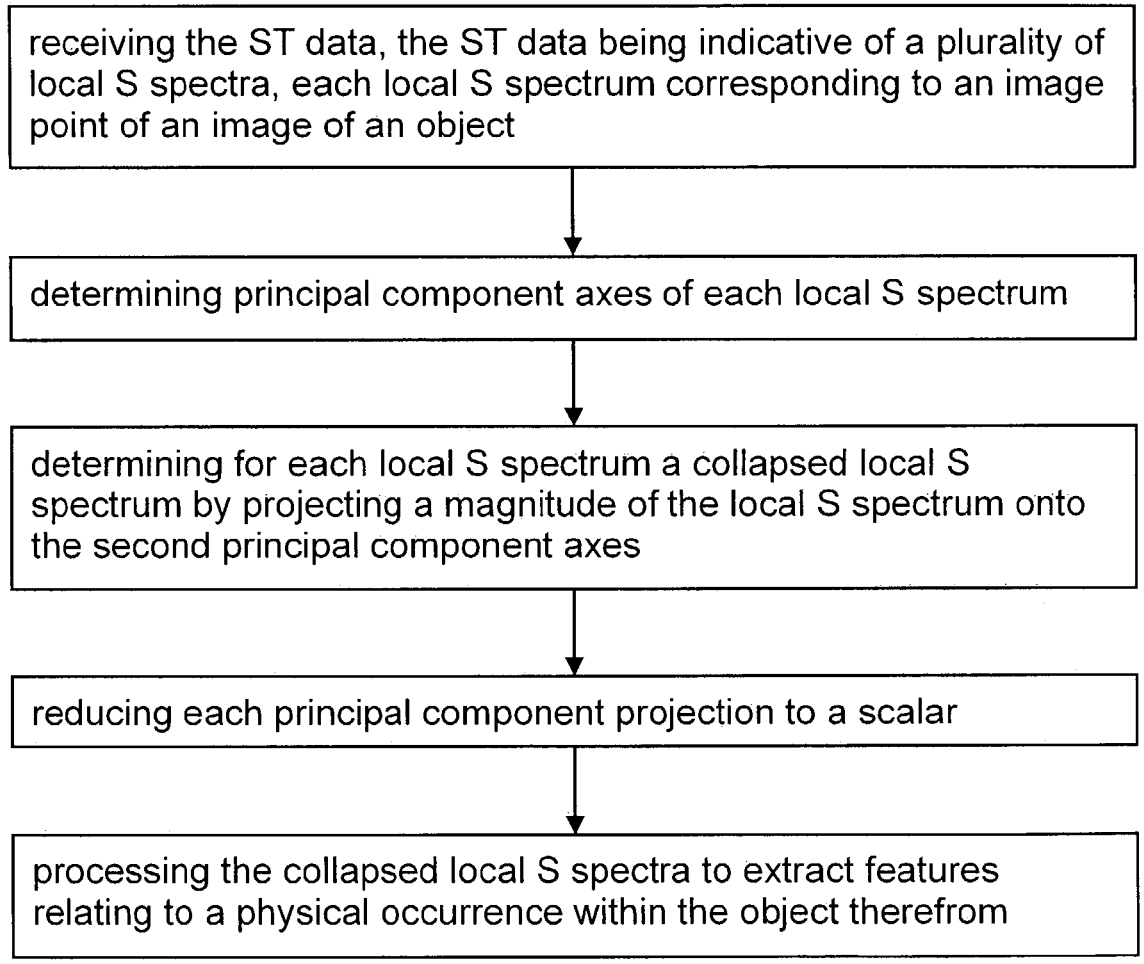

Referring to FIGS. 2a to 2c flow diagrams of various embodiments of a method for visualizing ST data according to the invention are shown. The method for visualizing ST data according to the invention comprises the following basic steps:

1) the principal components of each local spectrum are determined;
2) the magnitude of each local S spectrum is projected onto the first principal component axis. Thus the local S spectrum $S(x, y; k_x, k_y)$ becomes the collapsed local S spectrum $S(x, y; k)$ with k being the collapsed local frequency; and,
3) each principal component projection is then reduced to a scalar.

Alternatively, the magnitude of each local spectrum is projected onto the second principal component axis, FIG. 2b. Further alternatively, the magnitude of each local spectrum is projected onto both the first and the second principal component axis providing two collapsed local S spectra: $S_1$ (x, y; k) and $S_2$ (x, y; k), FIG. 2c.

Current ST research is focused on developing methods to reduce the local Fourier spectrum at an image point to a single value. The resulting function then has the same dimension as the original image facilitating analysis and further processing. For a given 2D image I(x, y) the resulting function T(x, y) resembles a map of "texture" if the scalar at each location (x, y) reflects an important or interesting feature in the local spectral distribution.

Figure 3A:
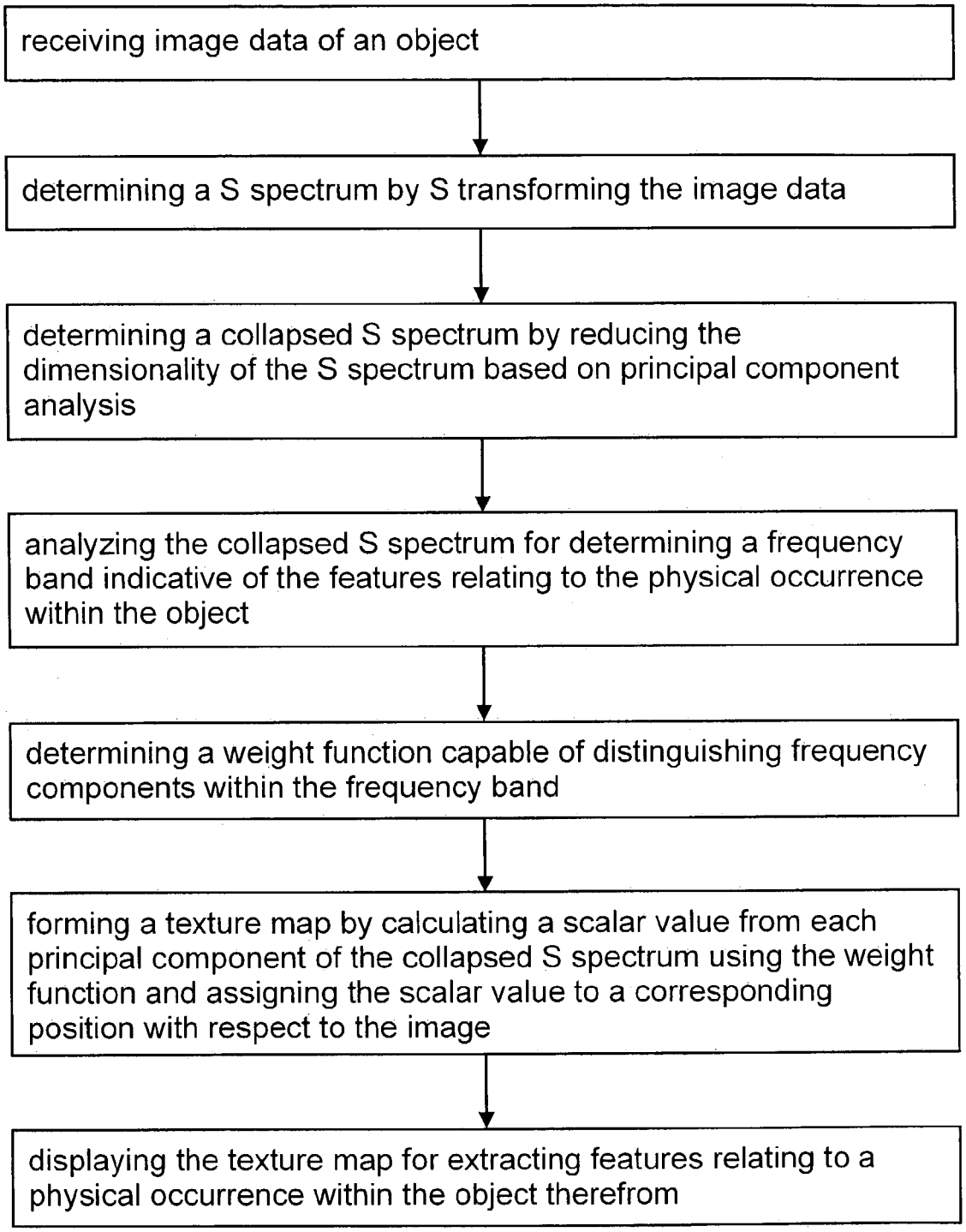
FIGS. 3a and 3b are simplified flow diagrams of a method for generating a texture map according to the invention.
Figure 3B:
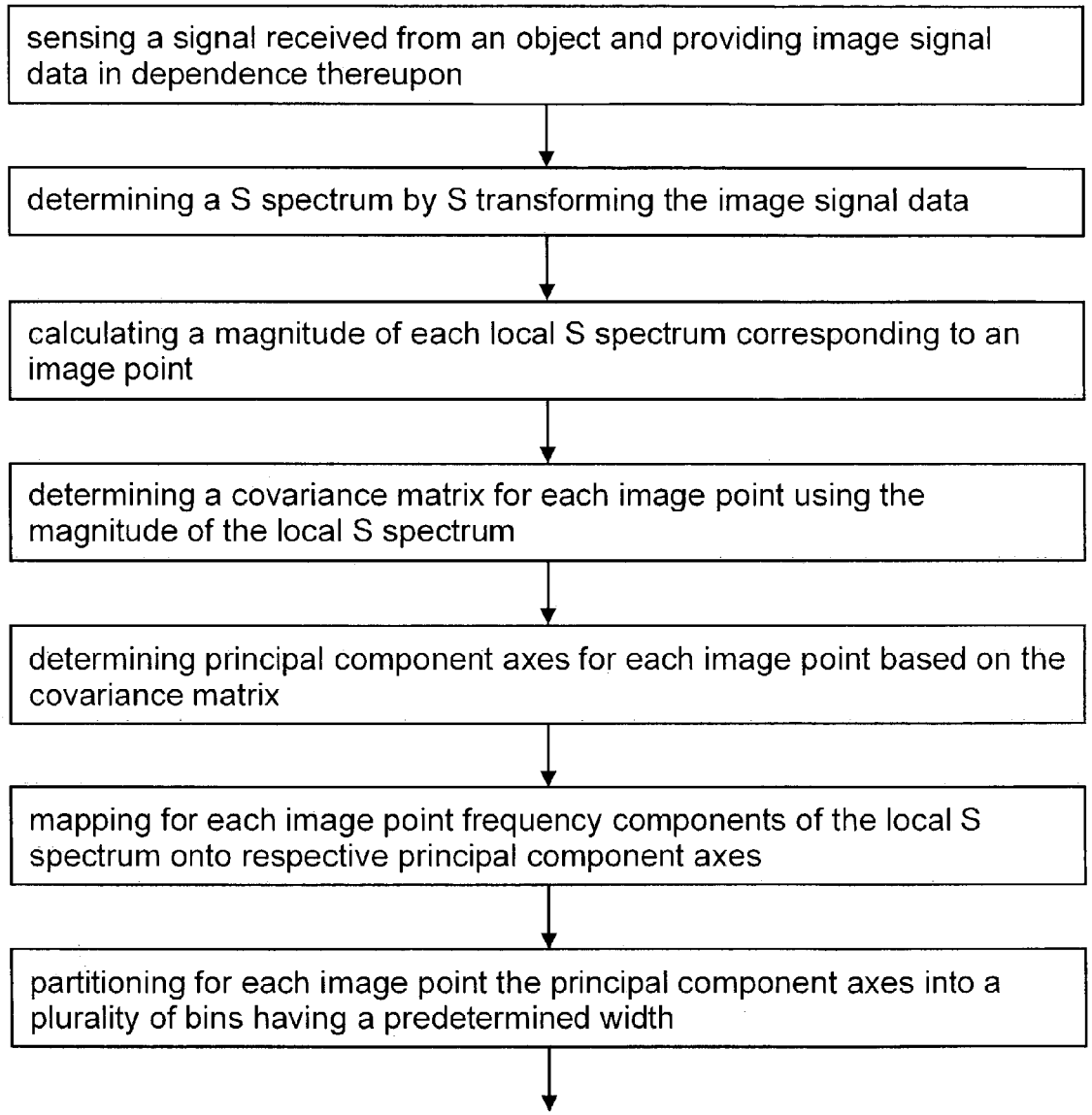
Figure 3B:
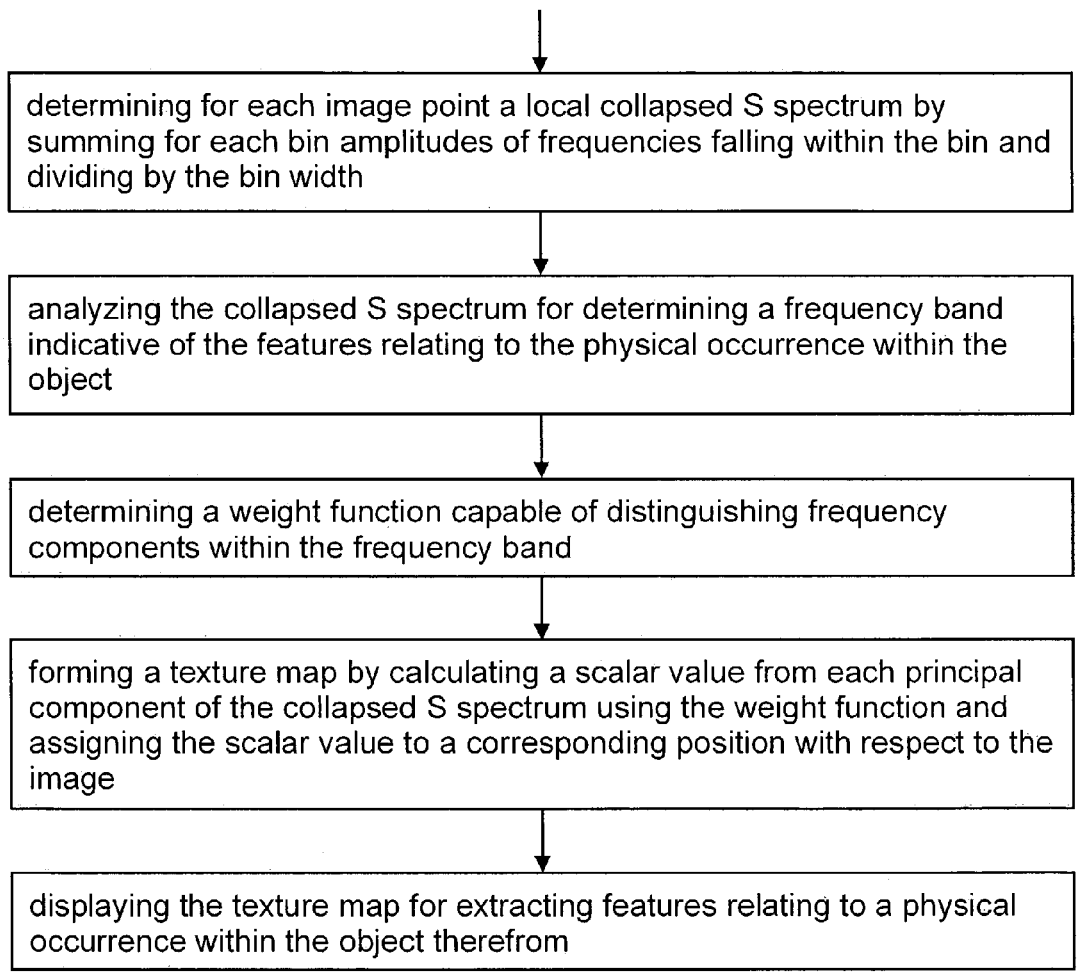

Referring to FIGS. 3a and 3b, a method for generating a "texture map" T(x, y) from a given image I(x, y) according to the invention is described. The method comprises the steps of:

a) applying the S transformation to the image I(x, y) resulting in the S spectrum $S(x, y; k_x, k_y)$;
b) reducing the dimensionality of the S spectrum $S(x, y; k_x, k_y)$ to the collapsed S spectrum $S(x, y; k)$ using the PCA;
c) if no prior knowledge of image frequency content is available, analyzing the collapsed S spectrum for determining a frequency band of interest using, for example, volume visualization tools;
d) determining a frequency band of interest from the analyzed collapsed S spectrum;
e) determining a weight function w=(w(k)) capable of distinguishing frequency components within the frequency band of interest; and,
f) calculating an appropriate scalar value from each principal component $S(x, y; k)|_{(x,y)}$ using the weight function w=(w(k)) and assigning the scalar value to the corresponding (x, y) position forming the texture map T(x, y).

Optionally, the steps c) of analyzing the collapsed S spectrum and d) of determining a frequency band of interest are omitted in case of prior knowledge of a frequency band of interest.

For example, the S transform in step a) is implemented using FFT methods in order to reduce computation time since the Fourier convolution theorem provides the following alternative representation of the S transform:

$$S(x, y, k_x, k_y) = \int_{-\infty}^{+\infty} \int_{-\infty}^{+\infty} H(\alpha + k_x, \beta + k_y) e^{-2\pi^2\left(\frac{\alpha^2}{k_x^2} + \frac{\beta^2}{k_y^2}\right)} e^{i2\pi(\alpha x + \beta y)} d\alpha d\beta,$$

where $H(k_x, k_y)$ is the Fourier transform of the image function I(x, y). The S transform is then calculated based on the following steps:

Step 1. Fast Fourier transforming the image function I(x, y) as follows:

$$H(\alpha, \beta) = FFT(I(x, y));$$

for each frequency $(k_x, k_y)$ where $k_x, k_y \neq 0$ performing the following steps 2 to 5;

Step 2. calculating a localizing 2D Gaussian window at the current frequency $(k_x, k_y)$:

$$G(\alpha, \beta; k_x, k_y) = \exp\left(-\frac{2\pi\alpha^2}{k_x^2}\right) \exp\left(-\frac{2\pi\beta^2}{k_y^2}\right);$$

Step 3. shifting the Fourier spectrum $H(\alpha,\beta)$ to $H(\alpha+k_x, \beta+k_y)$;

Step 4. computing $L(\alpha, \beta; k_x, k_y) = H(\alpha+k_x, \beta+k_y) \cdot G(\alpha, \beta; k_x, k_y)$, where "." point-wise multiplication;

Step 5. inverse fast Fourier transforming $L(\alpha, \beta; k_x, k_y)$ from the $(\alpha, \beta)$ plane to the (x, y) plane giving the two dimensional S transform $S(*,*, k_x, k_y)$ at the current frequency $(k_x, k_y)$. $S(*,*, k_x, k_y)$ provides the spatial information of the occurrence of the frequency $(k_x, k_y)$; and, Step 6. computing the ST data at the zero frequencies as disclosed for example in Mansinha L., Stockwell R. G., Lowe R. P., "Pattern analysis with two dimensional localization: Applications of the two dimensional S transform", Physica A., 1997; 239, 286-295.

In step b) the dimensionality of the 4D S spectrum $S(x, y; k_x, k_y)$ is reduced using principal component transforms, for example, as shown in the following steps. For each spatial point (x, y) the following steps 1 to 5 are performed:

Step 1. calculating a magnitude of the local spectrum $L(k_x, k_y) = |S(x, y, k_x, k_y)|_{(x,y)}$;

Step 2. computing a 2 by 2 covariance matrix $C=(c_{ij})$ where the element in the ith row and jth column is given by $$c_{ij} = \frac{1}{\sum_{(k_x, k_y)} L(k_x, k_y)} \sum_{(k_x, k_y)} (k_x - m_{kx})(k_y - m_{ky}) \cdot L(k_x, k_y),$$

where $m_{kx}$ and $m_{ky}$ are expected frequencies along frequency axes $k_x$ and $k_y$ respectively, with $$m_{kx} = \frac{1}{\sum_{(k_x, k_y)} L(k_x, k_y)} \sum_{(k_x, k_y)} k_x \cdot L(k_x, k_y)$$

-continued and $$m_{k_y} = \frac{1}{\sum_{(k_x,k_y)} L(k_x, k_y)} \sum_{(k_x,k_y)} k_y \cdot L(k_x, k_y);$$

Step 3. computing the principal component axes, i.e. the eigenvectors of the covariance matrix C;

Step 4. mapping the frequency indices onto each principal component axis; and,

Step 5. partitioning the principal component axes into a number of bins of equal predetermined width, summing for each bin the amplitudes of the frequencies whose indices fall within the bin and dividing by the bin width.

FIGS. 4a to 4d illustrate the procedure of reducing the local S spectrum $S(x, y, k_x, k_y)|_{(x,y)}$ at a single spatial point (x, y), i.e. one loop of steps 2 to 5, and the projections onto the principal component axes.

Figure 4A:
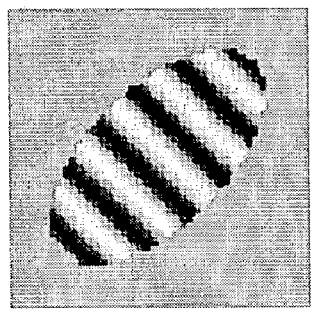
FIGS. 4a to 4d are diagrams illustrating the process of reducing the local S spectrum.
Figure 4B:
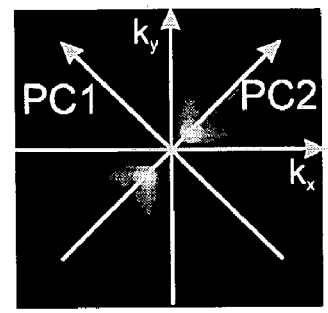
Figure 4C:
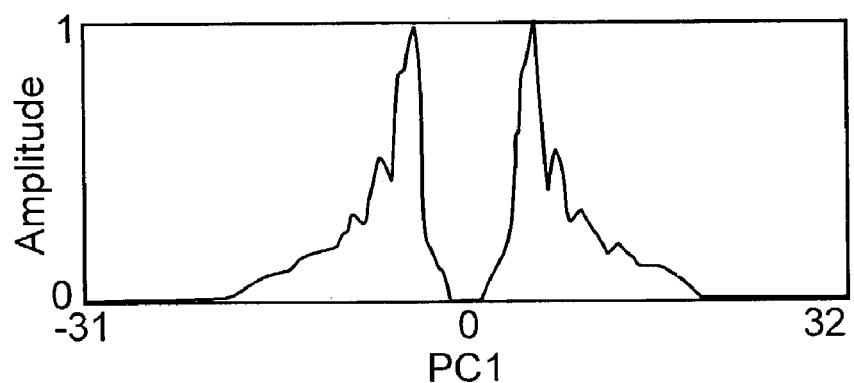
Figure 4D:
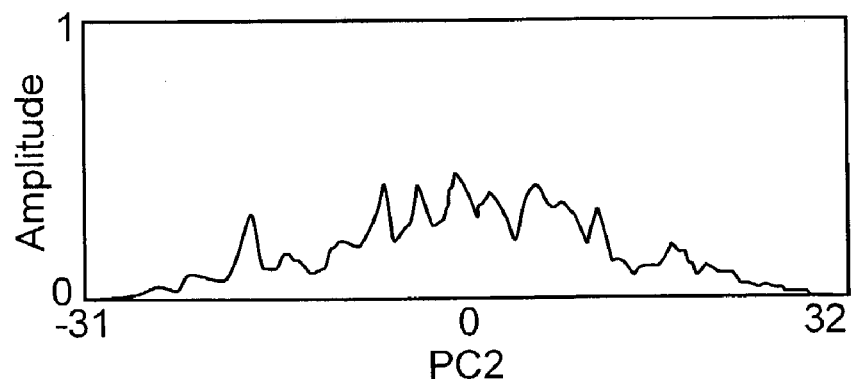

In an experiment, the S transform was applied to an elliptically shaped image having a single periodic pattern as shown in FIG. 4a. FIG. 4b illustrates the magnitude of the local S spectrum at the center point of the image along with the two principal component axes PC1 and PC2. The first principal component axis, PC1, aligns with the direction of the positive and negative dominant frequency components because of the large range of brightness, while the second principal component axis, PC2, follows the direction of the tails of the frequency components. FIGS. 4c and 4d illustrate the projection of the data in FIG. 4b onto each principal component axis. The projection onto PC1 illustrates the major frequency component, while the projection onto PC2 reflects the subtle changes of the frequency magnitude, which is evident by comparing the amplitudes and the shapes of the projections.

The bin width—step 5—was set to one. Projected values falling within each bin were summed, normalized by the bin width and considered to occur at the mid point of the bin. As is obvious, smaller bins provide more detailed frequency information than larger bins.

PCA reduction of the local S spectrum over all spatial points (x, y) yields the function S(x, y; k). Specifically, let $S_1(x, y; k)$ and $S_2(x, y; k)$ denote the 3D collapsed S spectrum function with respect to the first and second principal component axes, respectively. Thus, at each point (x, y), $S_1(x, y; k)$ and $S_2(x, y; k)$ provide information about the local frequency distribution.

Figure 5A:
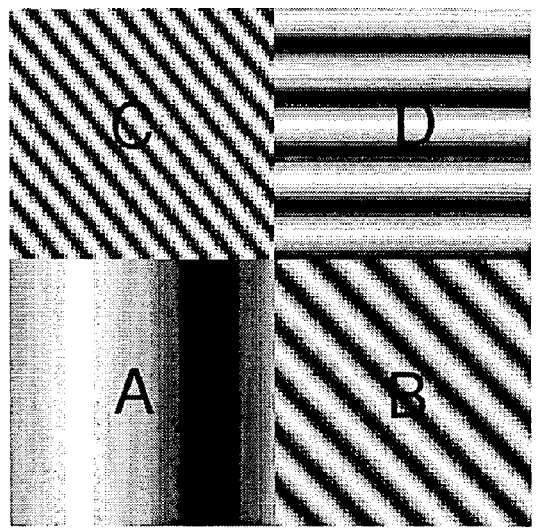
FIGS. 5a to 5c illustrate a test image and volume visualizations of its collapsed ST data.
Figure 5B:
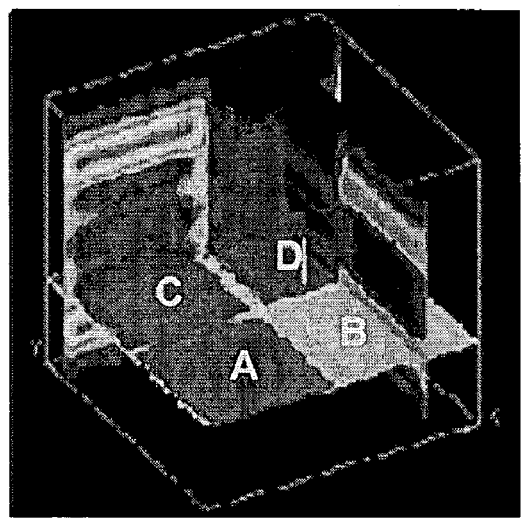
Figure 5C:
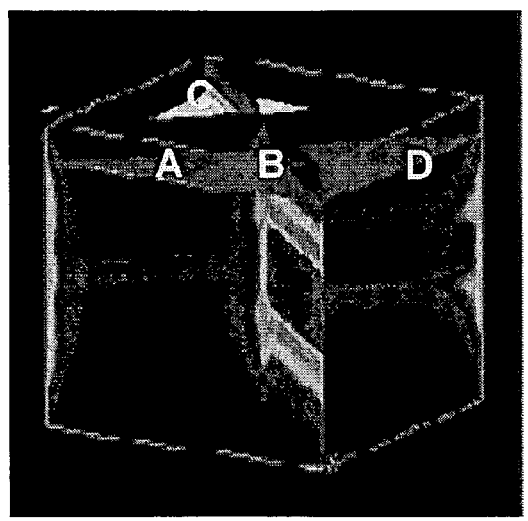
Figure 6:
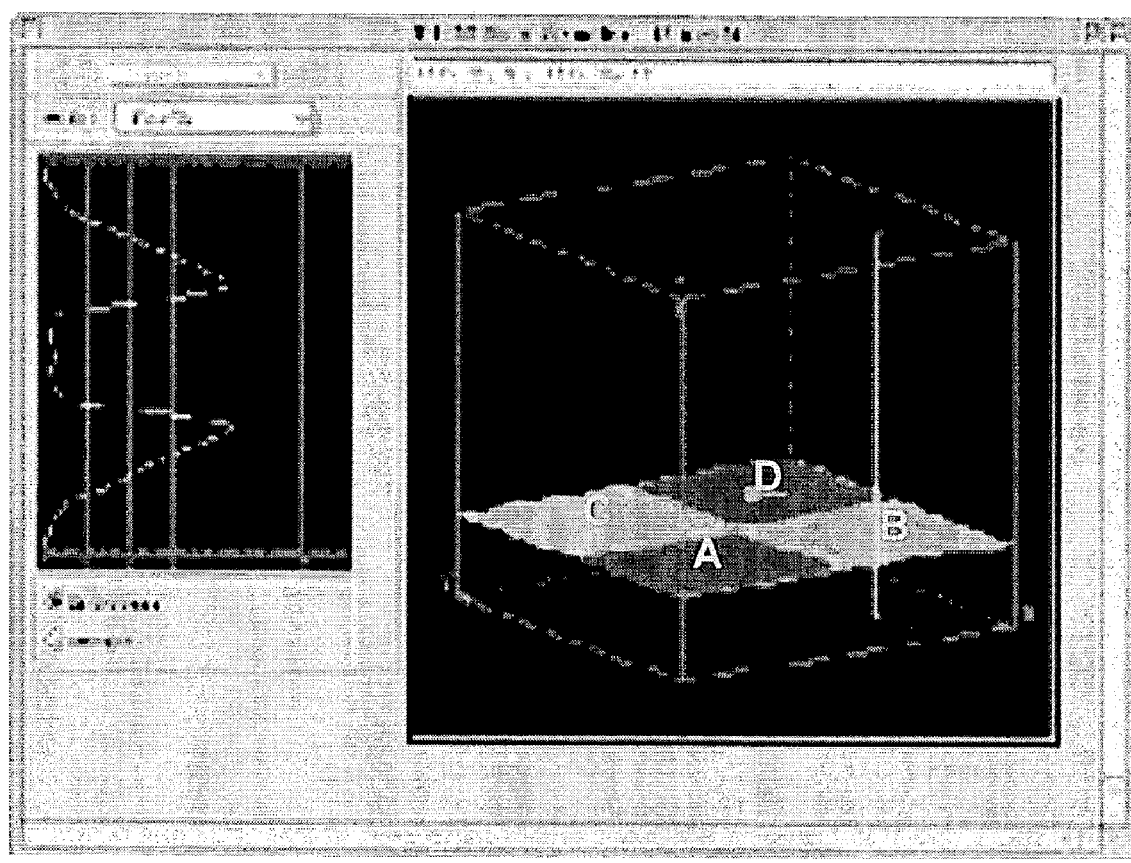
FIG. 6 illustrates interactive examination of the frequency content of the collapsed S spectrum.

Furthermore, both $S_1(x, y; k)$ and $S_2(x, y; k)$ allow detailed examination using volume visualization techniques as shown in the following example. FIG. 5a shows a test image comprising four regions each having a uniform spectral frequency. FIGS. 5b and 5c illustrate volume visualizations through the collapsed ST data, $S_1(x, y; k)$, projected onto the first principal components of the $(k_x, k_y)$ space at each spatial location. Using, for example, visualization tools for interactively visualizing 3D datasets such as the SLICER3 application in IDL 5.4 allows examination of the spatial frequency within each region of the image. Slicing $S_1(x, y; k)$ in the x-y plane orthogonal to the k axis, as shown in FIG. 5b, reveals that the spatial frequency of region A is less than that of region B, which in turn is less than that of regions C and D. Oblique slicing in the diagonal direction, shown in FIG. 5c, reveals that the spatial frequency of region C is greater than that of region D. FIG. 6 illustrates the possibility to interactively examine the frequency content at each spatial location. Here, a profile through $S_1(x, y; k)$ parallel to the k axis has been extracted from region B. The frequency distribution is symmetric about the origin—mid point of the profile—and reveals one major frequency component in region B.

The method for visualizing ST data based on the PCA according to the invention is highly advantageous for analyzing ST data by substantially retaining the local frequency information and yet not requiring prior knowledge of the frequency content.

Regarding computing time and storage the ST comprises for a N by N image $O(N^4 \log N)$ operations and $O(N^4)$ storage space. For the same N by N image the computing time and storage for the PCA reduction comprises $O(N^4)$ operations and $O(N^3)$ storage space.

As is evident, there are numerous choices of the weight function in step e). For example, if the frequencies of interest are low, the weight function is selected as $w(k)=k^r$ where constant r is 0<r<1 and the resulting texture map T(x, y) allows to distinguish well low frequency components. On the other hand, if the interesting frequencies are high, the weight function is selected as $w(k)=k^r$ where constant r is $r \geq 1$. The middle frequency components are separated well using a Gaussian window function $$w(k) = \frac{1}{\sqrt{2\pi\sigma^2}} \exp(-(k-c)^2/(2\sigma^2)),$$

where c is the center of the frequency band of interest and σ is half of the bandwidth. Optionally, the weight function is chosen to be discontinuous. For example, w(k) is constant within the band of interest and zero otherwise.

Furthermore, there are numerous possibilities to calculate a scalar from the collapsed local S spectrum—step f) above. Let $s_{xy}=(s_{xy}(k))$ denote the collapsed S spectrum $S(x, y, k)|_{(x,y)}$ at the spatial point(x, y). For example, the scalar is calculated as the first, second, or higher moment of $s_{xy}$. In particular, the mean frequency (MF) of $s_{xy}$ is:

$$MF(x, y) = \frac{1}{\sum_k s_{xy}(k)} \sum_k k \cdot s_{xy}(k),$$

and the mean amplitude (MA) of $s_{xy}$ is:

$$MA(x, y) = \frac{1}{N} \sum_{k=0}^{N-1} s_{xy}(k),$$

where N is the length of $s_{xy}$.

Figure 7A:
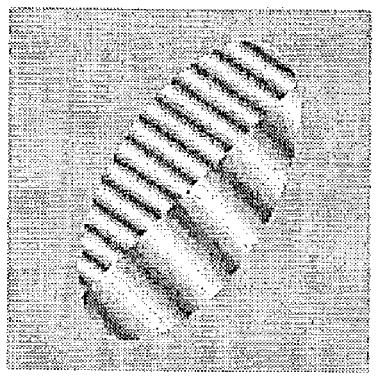
FIGS. 7a to 7c illustrate a test image and corresponding texture maps.
Figure 7B:
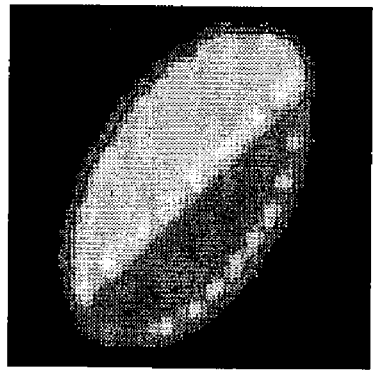
Figure 7C:
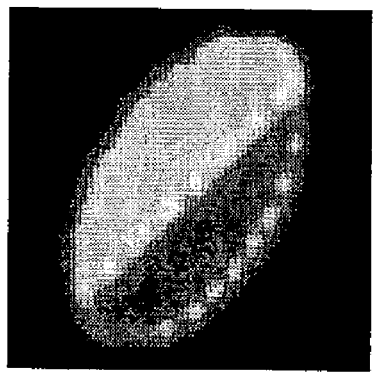

Referring to FIGS. 7a to 7c, a test image of an ellipse comprising two different frequency areas and corresponding texture maps produced using the visualization method according to the invention are shown. The texture map provides information about the spatial frequency content on a pixel-by-pixel basis. FIG. 7b shows a texture map produced by mean amplitudes of the projections onto the first principal component axes. Similarly, FIG. 7c shows a texture map produced by mean amplitudes of the projections onto the second principal component axes. Gray areas in the texture maps indicate local frequency content. Darker areas correspond to lower frequencies and brighter areas to higher frequencies. Both, FIGS. 7b and 7c clearly distinguish the two different frequency areas within the ellipse. The bright dots in the texture maps result from edges between the two different frequency areas of the ellipse and from edges between the ellipse and background having high frequency content.

The method for generating a texture map according to the invention has numerous advantages. For example, the principal component projections substantially preserve the local frequency distribution while reducing the dimensionality of the $k_x$-$k_y$ plane. Furthermore, the collapsed ST data $S(x, y, k)$ is readily visualized allowing revealing of spectral features of interest. Yet further, the method according to the invention provides more sensitive and more specific texture maps substantially facilitating image analysis.

Figure 8A:
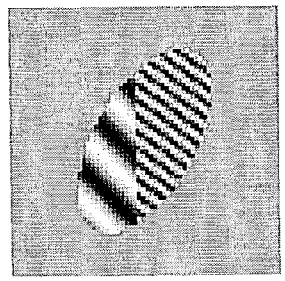
FIGS. 8a to 8f illustrate a test image and corresponding texture maps obtained using the visualization method according to the invention and prior art methods; and, FIGS. 9a to 9f illustrate a test image and corresponding texture maps obtained using the visualization method according to the invention and prior art methods.
Figure 8B:
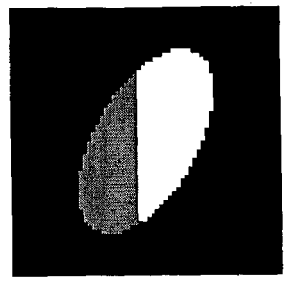
Figure 8C:
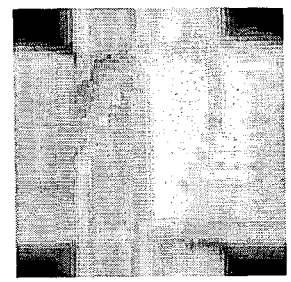
Figure 8D:
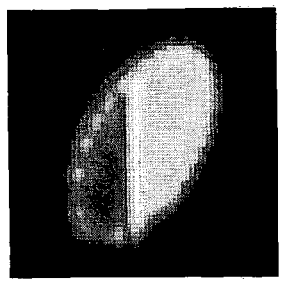
Figure 8E:
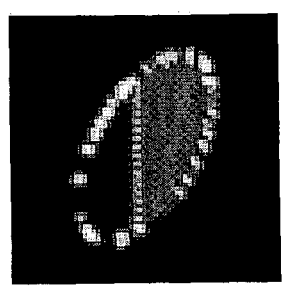
Figure 8F:
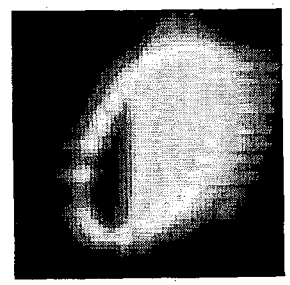

Referring to FIGS. 8a to 8f and 9a to 9f, a comparison of results from processed test images using the method for visualizing ST data according to the invention with results obtained from prior art methods is shown. FIGS. 8a and 8b show a test image and the corresponding texture map with exact frequencies, respectively. FIGS. 8c to 8f illustrate texture maps produced by four different visualization methods. The texture maps shown in FIGS. 8c and 8d are obtained using the method according to the invention. In particular, the texture map shown in FIG. 8c is produced by first projecting the local S spectrum onto the first principal component axes and then calculating the mean frequencies—denoted as PCA_MF(x, y) and the texture map shown in FIG. 8d is produced by first projecting the local S spectrum onto the first principal component axes and then calculating the mean amplitudes—denoted as PCA_MA(x, y). The texture maps shown in FIGS. 8e and 8f are obtained using the ADM method mentioned above and denoted as ADM (x, y) and the WSP method denoted as WSP (x, y), respectively. FIGS. 9a to 9f show the texture maps of a different test image using the same set of texture mapping methods as in FIGS. 8a to 8f.

Figure 9A:
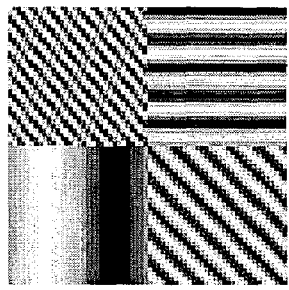
Figure 9B:
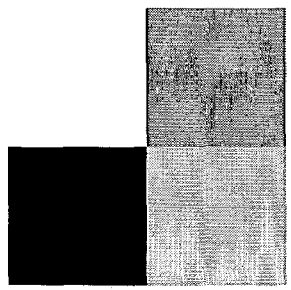

The performance of each visualization method has been quantified by calculating the difference between the derived texture map $T(x, y)$ and the exact frequency map $F(x, y)$. The differences have been evaluated using three functions: Euclidian distance, mutual information and cross-correlation. The results for the test images shown in FIGS. 8a and 9a are summarized in tables 1 and 2, respectively.

TABLE 1

| Parameters\Method | PCA_MF | PCA_MA | ADM | WSP |
|---|---|---|---|---|
| Distance | 1.1126 | 0.4377 | 0.9569 | 0.8871 |
| Mutual Information | 0.3195 | 0.5115 | 0.3006 | 0.2986 |
| Cross-correlation | 0.1178 | 0.1051 | 0.0839 | 0.1089 |

TABLE 2

| Parameters\Method | PCA_MF | PCA_MA | ADM | WSP |
|---|---|---|---|---|
| Distance | 0.4890 | 0.4595 | 0.5184 | 0.5174 |
| Mutual Information | 0.6799 | 0.8194 | 0.3940 | 0.2989 |
| Cross-correlation | 0.1677 | 0.1179 | 0.1229 | 0.1105 |

Overall, the texture maps obtained using the visualization method according to the invention have minimum distance, contain more mutual information, and have more cross-correlation to the exact frequency map $F(x,y)$. Furthermore, the texture maps show visually and numerically better contrast between different frequency regions than those obtained using the prior art.

Figure 9C:
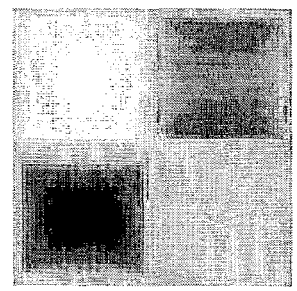
Figure 9D:
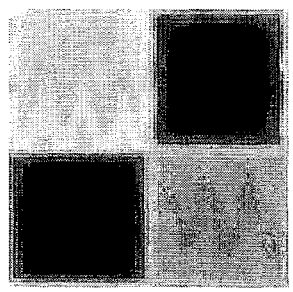
Figure 9E:
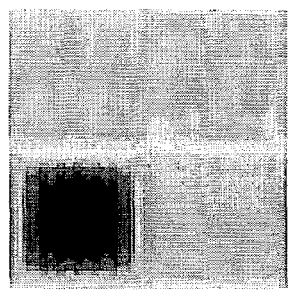
Figure 9F:
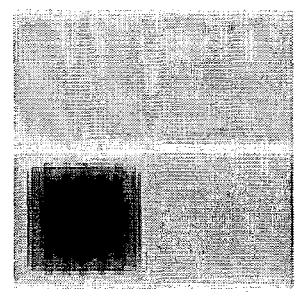

The artifacts in the background and the blurring around the edges in FIGS. 8c and 9c are caused by two contributing factors. The first is due to the windowing technique of the S transform. The local S spectra at a point $(x, y)$ are obtained by applying Fourier transforms to a neighborhood centered at $(x, y)$, the area of which is controlled by Gaussian filtering window widths proportional to the inverse of the local frequencies. Therefore, wider windows at low frequencies cause low frequency areas to be affected by adjacent high frequency content. Thus, the frequency content within the ellipse in FIG. 8c affects the image background, and the edges of the low frequency areas in FIG. 9c are blurred by the adjacent higher frequencies. The second contributing factor is that the calculation of the mean frequency does not distinguish between small and large events at a same frequency. Therefore, it returns a same value for small frequency events such as those carried over to the background and for large frequency events such as those occurring in the ellipse. These artifacts are easily removed using mask or threshold techniques.

Optionally, texture maps generated using the PCA_MF method are combined with other texture maps generated using, for example, the PCA_MA method to reduce artifacts.

Further optionally, the PCA method according to the invention is integrated into existing visualization methods such as the WSP. For example, a vector version of the WSP is applied to derive the scalar value at each spatial location:

$$PCA\_WSP(x, y) = \frac{1}{\|s_{xy}\|\|w\|} \sum_k s_{xy}(k) \cdot w(k),$$

where $w(k)$ is a weighting function.

The visualization method according to the invention is highly beneficial by providing a tool for image analysis that substantially retains the local frequency information and does not require prior knowledge of the frequency content of an image. Employment of the visualization method according to the invention is highly beneficial, for example, in motion artifact suppression in MRI image data, texture analysis and disease specific tissue segmentation.

Alternatively, in the step of partitioning, the principal component axes are partitioned into a number of bins of unequal predetermined width. Further alternatively, during the step of partitioning the principal component axes are partitioned into a number of bins of equal but other than predetermined width. Further alternatively, during the step of partitioning the principal component axes are partitioned into a number of bins of unequal width and other than predetermined width.

Numerous other embodiments of the invention will be apparent to persons skilled in the art without departing from the spirit and scope of the invention as defined in the appended claims.

What is claimed is:

1. A method for visualizing ST data comprising:
  receiving the ST data, the ST data being indicative of a plurality of local S spectra, each local S spectrum corresponding to an image point of an image of an object;

determining principal component axes of each local S spectrum, determining for each local S spectrum a collapsed local S spectrum by projecting a magnitude of the local S spectrum onto at least one of its principal component axes;

processing the collapsed local S spectra to extract features relating to a physical occurrence within the object therefrom;

generating visualization data indicative of the extracted features; and, providing the visualization data.

2. A method for visualizing ST data as defined in claim 1 wherein the principal component axes are determined based on orthogonal eigenvectors of a covariance matrix associated with the local spectrum.

3. A method for visualizing ST data as defined in claim 2 wherein the magnitude of each local S spectrum is projected onto a first principal component axis.

4. A method for visualizing ST data as defined in claim 2 wherein the magnitude of each local S spectrum is projected onto a second principal component axis.

5. A method for visualizing ST data as defined in claim 2 wherein the magnitude of each local S spectrum is projected onto a first principal component axis providing a first collapsed S spectrum and onto a second principal component axis providing a second collapsed S spectrum.

6. A method for visualizing ST data as defined in claim 2 wherein the step of processing the collapsed local S spectra comprises analyzing the collapsed local S spectra for determining a frequency band indicative of the features relating to a physical occurrence within the object.

7. A method for visualizing ST data as defined in claim 2 wherein the step of processing the collapsed local S spectra comprises suppression of motion artifacts in the image.

8. A method for visualizing ST data as defined in claim 1 comprising:

determining a weight function capable of distinguishing frequency components within a frequency band;

forming a texture map by calculating a scalar value from each principal component of the collapsed local S spectra using the weight function and assigning the scaler value to a corresponding position with respect to the image; and, displaying the texture map for extracting features relating to a physical occurrence within the object therefrom.

9. A method for visualizing ST data as defined in claim 8 comprising analyzing the collapsed local S spectra for determining a frequency band indicative of the features relating to the physical occurrence within the object.

10. A method for visualizing ST data as defined in claim 9 wherein the collapsed local S spectra are analyzed using volume visualization.

11. A method for visualizing ST data as defined in claim 9 wherein the weight function is a continuous frequency dependent function.

12. A method for visualizing ST data as defined in claim 11 wherein the weight function is a Gaussian window function.

13. A method for visualizing ST data as defined in claim 10 wherein the weight function is a discontinuous frequency dependent function.

14. A method for visualizing ST data as defined in claim 9 wherein the scalar value is calculated as a moment of the collapsed local S spectra at the corresponding position.

15. A method for visualizing ST data as defined in claim 14 wherein the scalar value is calculated as mean frequency of the collapsed local S spectra at the corresponding position.

16. A method for visualizing ST data as defined in claim 14 wherein the scalar value is calculated as mean amplitude of the collapsed local S spectra at the corresponding position.

17. A method for processing ST data comprising:

providing the ST data, the ST data being indicative of a plurality of local S spectra, each local S spectrum corresponding to an image point of an image of an object;

performing PCA on the ST data to determine PCA results by determining with PCA principal component axes of each local spectrum;

generating based on the PCA results visualization data of the object within the Stockwell domain; and, providing the visualization data for extracting features relating to a physical occurrence within the object therefrom.

18. A method for processing ST data as defined in claim 17 absent prior knowledge of frequency content of the image data based on the PCA results.

19. A method for processing ST data as defined in claim 17 wherein the principle component axes are used in generating the visualization data.

20. A method for processing ST data comprising:

sensing a signal received from an object and providing image signal data in dependence thereupon;

determining a S spectrum by S transforming the image signal data;

calculating a magnitude of each local S spectrum corresponding to an image point;

determining a covariance matrix for each image point using the magnitude of the local S spectrum;

determining principal component axes for each image point based on the covariance matrix;

mapping for each image point frequency components of the local S spectrum onto respective principal component axes;

partitioning for each image point the principal component axes into a plurality of bins having a predetermined width;

determining for each image point a local collapsed S spectrum by summing for each bin amplitudes of frequencies falling within the bin and dividing by the bin width;

generating from the local collapsed S spectra visualization data of the object within the Stockwell domain; and, providing the visualization data for extracting features relating to a physical occurrence within the object therefrom.

21. A method for processing ST data as defined in claim 20 wherein the S spectrum is determined by applying Fourier convolution.

22. A method for processing ST data as defined in claim 21 wherein the S spectrum is determined using FFT.

23. A method for processing ST data as defined in claim 22 comprising:

forming a texture map by determining for each image point a scalar value from the local collapsed S spectrum; and, displaying the texture map for extracting features relating to a physical occurrence within the object therefrom.

24. A system for displaying ST data comprising:

a processor for:

receiving the ST data, the ST data being indicative of a plurality of local S spectra, each local S spectrum corresponding to an image point of an image of an object;

performing PCA on the ST data to determine PCA results by determining with PCA principal component axes of each local spectrum;

generating based on the PCA results visualization data of the object within the Stockwell domain; and, providing the visualization data; and, a display in data communication with the processor for displaying the visualization data for extracting features relating to a physical occurrence within the object therefrom.

25. A system for displaying ST data as defined in claim 24 comprising a sensor in data communication with the processor for sensing image data, wherein the processor is for transforming the image data into the S domain to form the ST data.

26. A system for displaying ST data as defined in claim 25 wherein the sensor is for sensing MR signals.

27. A system for displaying ST data as defined in claim 24 comprising an interface for receiving user instructions for interactively visualizing the image data.

* * * * *